United States Patent
Aggarwal et al.

(10) Patent No.: US 12,513,176 B2
(45) Date of Patent: Dec. 30, 2025

(54) LARGE LANGUAGE MODEL BASED INTELLIGENT MALICIOUS PACKET DETECTION

(71) Applicant: A10 Networks, Inc., San Jose, CA (US)

(72) Inventors: Madhav Aggarwal, San Jose, CA (US); Vishnu Vasanth Radja, San Jose, CA (US); Vernon Richard Groves, San Jose, CA (US)

(73) Assignee: A10 NETWORKS INC, San Jose, CA (US)

( * ) Notice: Subject to any disclaimer, the term of this patent is extended or adjusted under 35 U.S.C. 154(b) by 178 days.

(21) Appl. No.: 18/513,244

(22) Filed: Nov. 17, 2023

(65) Prior Publication Data

US 2025/0141899 A1    May 1, 2025

Related U.S. Application Data

(63) Continuation of application No. 18/384,379, filed on Oct. 26, 2023, now abandoned.

(51) Int. Cl.
| | |
|---|---|
| *H04L 9/40* | (2022.01) |
| *G06F 16/35* | (2019.01) |
| *G06F 16/9535* | (2019.01) |
| *G06F 40/20* | (2020.01) |
| *G06F 40/284* | (2020.01) |
| *G06F 40/58* | (2020.01) |
| *G06N 3/0455* | (2023.01) |

(52) U.S. Cl.
CPC .......... *H04L 63/1425* (2013.01); *G06F 16/35* (2019.01); *G06F 16/9535* (2019.01); *G06F 40/20* (2020.01); *G06F 40/284* (2020.01); *G06F 40/58* (2020.01); *G06N 3/0455* (2023.01)

(58) Field of Classification Search
CPC ...... G06F 16/35; G06F 16/9535; G06F 40/20; G06F 40/58
See application file for complete search history.

(56) References Cited

U.S. PATENT DOCUMENTS

| | | | | |
|---|---|---|---|---|
| 12,340,191 | B1* | 6/2025 | Serban | G06N 3/08 |
| 2023/0386450 | A1* | 11/2023 | Eby | G06F 40/284 |
| 2024/0354830 | A1* | 10/2024 | Raghavan | G06Q 30/0631 |
| 2024/0412011 | A1* | 12/2024 | Hoang | G06F 40/58 |
| 2024/0419903 | A1* | 12/2024 | Wu | G01C 21/34 |
| 2025/0014571 | A1* | 1/2025 | Wu | G10L 15/16 |
| 2025/0036800 | A1* | 1/2025 | Joshi | G06F 40/20 |
| 2025/0131262 | A1* | 4/2025 | Bang | G06V 10/82 |
| 2025/0148031 | A1* | 5/2025 | Rakhmanov | G06F 16/9535 |
| 2025/0156460 | A1* | 5/2025 | Gibson | G06F 16/35 |

* cited by examiner

*Primary Examiner* — Barbara B Anyan
(74) *Attorney, Agent, or Firm* — Keith Kline

(57) ABSTRACT

A method and system for detecting malicious network packets via an intelligent large language model are described. In addition, a method for fine-tuning a pretrained large language model to detect malicious network packets is described. The training process generates a plurality of embeddings from input network packet data, generates clusters for those embeddings, performs an entropy analysis, and calculates a loss value. Contrastive learning is used to further fine-tune the large language model based embedder.

19 Claims, 16 Drawing Sheets

| | Low Sensitivity | Medium Sensitivity | High Sensitivity | New Tool |
|---|---|---|---|---|
| | - | | | 52.63 |
| | - | | | 51.725 |
| | - | | | 51.823 |
| | 1.309 | 19.208 | 19.208 | 55.06 |
| | 26.22 | - | - | 54.06469279 |
| | 15.1 | 40.74 | 40.74 | 54.63085975 |
| | 13.53 | 0 | 0 | 61.705 |
| | 17.344 | 0 | 0 | 61.34219554 |
| | 24.07 | 0 | 0 | 56.83618174 |
| | 19.544 | 0 | 0 | 89.81 |
| | 57.3 | 57.3 | 57.3 | 63.87246235 |
| | 26.53 | 0 | 0 | 58.38046272 |

FIG. 11

LARGE LANGUAGE MODEL BASED INTELLIGENT MALICIOUS PACKET DETECTION

CROSS-REFERENCE TO RELATED APPLICATIONS

This application is a continuing application of, and claims the priority benefit of, U.S. application Ser. No. 18/384,379, filed Oct. 26, 2023, entitled "LARGE LANGUAGE MODEL BASED INTELLIGENT MALICIOUS PACKET DETECTION."

TECHNICAL FIELD

This disclosure relates generally to data processing, and more particularly, to detection of malicious network packets.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

A conventional method for detection of a distributed denial of service (DDOS) attack involves monitoring a data flow to determine rates and trends of various indicators (e.g., packets per second, octets, flags, connections, connections per second, and so forth) at any moment of time during both peace time (when no attack is present) and attack time, to collect data based on which of a baseline of indicators is created. When the indicators exceed the peacetime baseline, an attack detector may begin to take actions to mitigate the attack or other measures in response to the attack. Such other measures can include a counter attack, publication of the identity of the originator, or a conscious decision to take no action.

Typically, thresholds for the monitored indicators are determined manually, and thus are not adaptable to a rapidly changing network environment. As such, a dynamic method is needed to detect DDoS attack network traffic, as well as other types of malicious network traffic.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for training and implementing an intelligent large language model based packet detection software tool. According to one method of training the model, a computing device processes a training data set of network packets with a large language model (LLM) based embedder to generate a plurality of embeddings. A plurality of clusters is then generated by the computing device from the plurality of embeddings. The computing device further performs an entropy analysis of the generated plurality of clusters from the plurality of embeddings, and computes a loss value from a result of the performed entropy analysis. The LLM based embedder is then updated based on the computed loss value.

A further method for implementing the model comprises processing network packets at a trained large language model (LLM) based embedder to generate a plurality of embeddings. A plurality of clusters is then generated from the plurality of embeddings, and a Berkeley Packet Filter is generated from the clusters, to filter out the malicious network packets.

In further example embodiments of the present disclosure, hardware systems or devices can be adapted to perform the recited operations. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

FIG. 11 depicts an exemplary table of results, as to accuracy of prediction of an intelligent malicious packet detection software tool.

DETAILED DESCRIPTION

Figure 1:
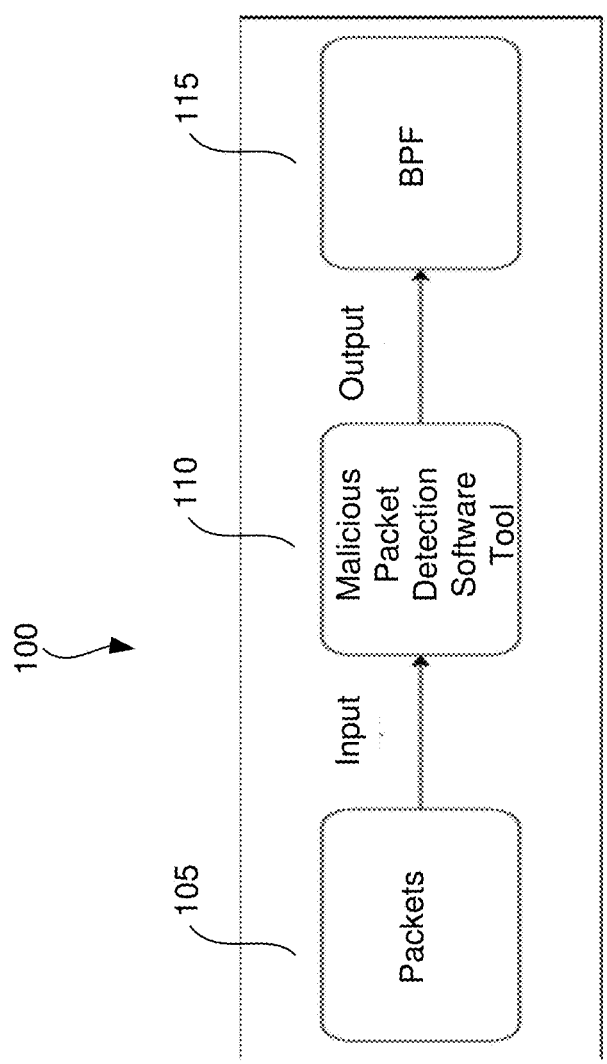
FIG. 1 depicts an example workflow for malicious packet detection software.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, a tablet computer, a laptop computer), a game console, a handheld gaming device, a cellular phone, a smart phone, a smart television system, a cloud based system, and so forth.

As discussed herein, the embodiments of the present disclosure are directed to detecting malicious network traffic based on an intelligent large language model. Embodiments of the present disclosure provide a Distributed Denial-of-Service (DDoS) attack detection software tool that can successfully filter out attack network traffic, or otherwise trigger actions in response to the attack, based on historical data and a large language model (LLM). A DDoS attack maliciously disrupts traffic to a targeted server, service, or network by overwhelming the target or its surrounding infrastructure with a flood of internet traffic, thus denying the target's ability to provide service to legitimate users. While embodiments of the attack detection software tool are described herein with respect to DDoS attack detection, other embodiments of the software tool can be used to detect presence of malware, or any other type of malicious packets that disrupt network traffic flow.

The present disclosure provides for the use of a malicious packet detection software tool, that is powered by the use of one or more large language models. As used herein, a large language model is an artificial neural network that is pre-trained using self-supervised learning and semi-supervised learning, using transformer architecture. The LLM operates by taking an input text and repeatedly predicting the next token or word. The model is adapted to accomplish specific tasks (such as detect a DDoS attack) using fine tuning.

The present disclosure further relies on Generative Pre-trained Transformers (GPT), which are a type of neural network models that use the transformer architecture. By using a LLM for malicious packet detection, the software tool is dynamic and can adapt to varying attack patterns on its own, without the need for manually set thresholds of prior methods, thus enhancing cybersecurity safety for a network.

To train the malicious packet detection software tool, network packets are parsed through an embedder that is powered by a large language model. The embedder generates embeddings for the transformer neural network from the input network packet data. The trained model can then be further fine tuned for different types of malicious packets, such as for DDoS attack detection, by training with historical attack data, thus providing context. In some embodiments, the model is fine tuned for DDoS attack detection by training with data from past DDoS attacks. As such, the model is trained specifically for DDoS attack detection using historical data, and not simply relying on analyzing traffic patterns, as other DDoS attack detection tools commonly do. In some embodiments, model fine tuning is accomplished via contrastive learning.

Through this method, the model is taught to separate malicious network packets from non-malicious network packets. By employing the presently disclosed intelligent malicious packet detection software tool, a network provider can recognize malicious traffic sooner rather than later, and take steps to mitigate effects of the malicious traffic or otherwise respond to such malicious traffic. Thus, network reliability and efficiency is enhanced.

Turning to the figures, FIG. 1 depicts an example workflow 100 for malicious packet detection software. At 105 of workflow 100, packets 105 are received as input to Malicious Packet Detection Software Tool 110. An output from malicious packet detection software tool 110 is then used to generate a Berkeley Packet Filter (BPF) 115, which in turn can be used for further processing of packets 105. In some embodiments, the generated BPF 115 can be used to mitigate an effect of malicious packets on network infrastructure and traffic.

Figure 2:
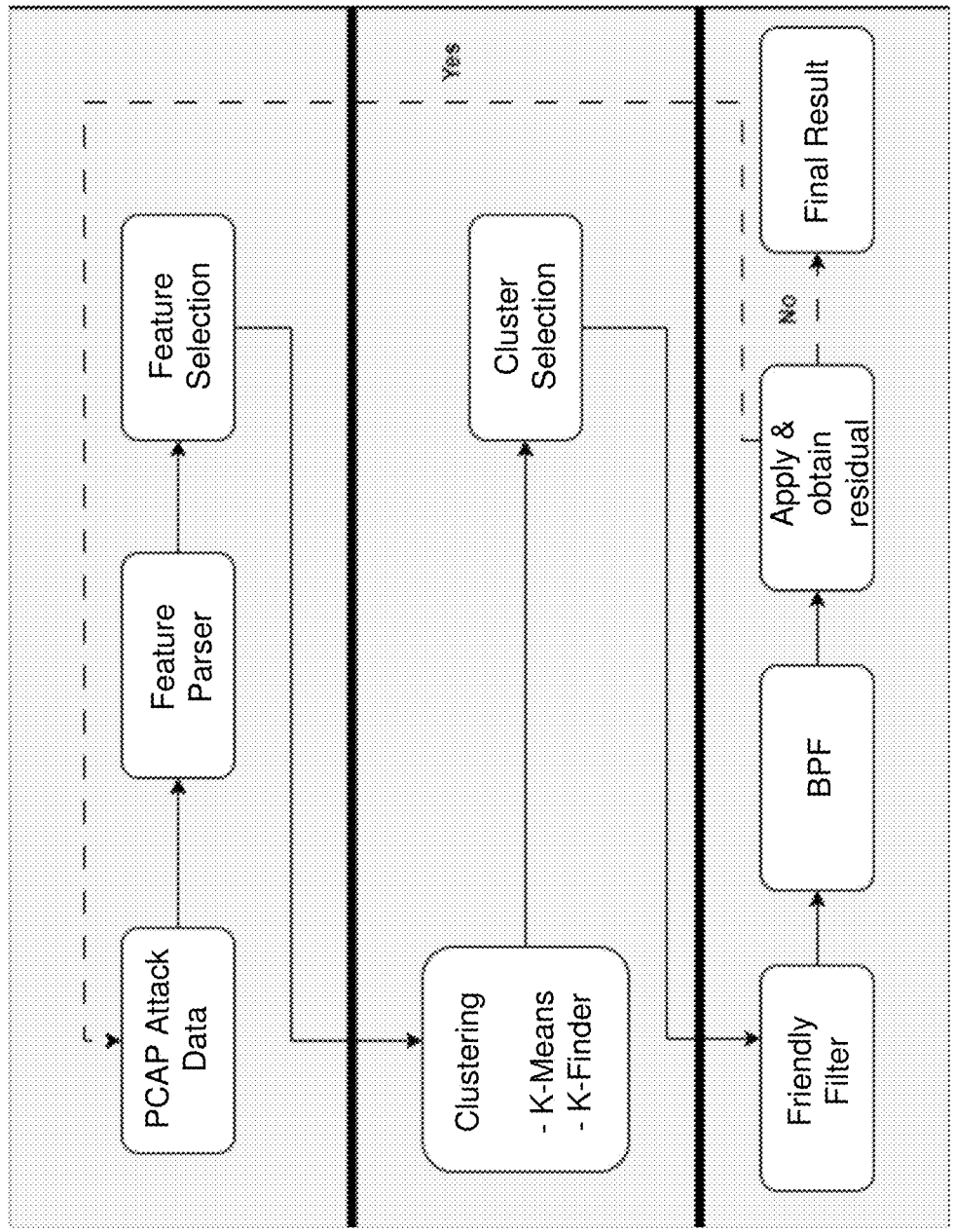
FIG. 2 depicts example components for malicious packet detection and mitigation software according to prior systems.

FIG. 2 depicts example components for malicious packet detection and mitigation software according to prior systems. In prior systems, PCAP attack data (from packet capture file(s)) is used for training the software. The attack data is processed through a feature parser, then features are selected. In these prior systems, the feature parser and feature selection are performed by setting predetermined thresholds manually. However, since threshold values may change from one attack to another, features selected for one set of threshold values associated with a first attack may not be optimal for another set of threshold values associated with a second attack.

In prior systems, clustering is also conducted on the data, and a friendly filter is generated. Typically, a larger per packet size (PPS) or bandwidth cluster is selected for removal. However, this choice between PPS or bandwidth is set manually. Thus, the software is trained to perform well for those particular set of parameters, but may not adapt very well to other sets of parameters.

From a friendly filter, a BPF is generated. As used herein, a BPF is a set of filtering rules. A residual is applied and obtained, and a final result is output from the software. This result is used to detect and mitigate or otherwise respond to an effect of malicious packets, such as from a DDoS attack which disrupts a normal traffic of a targeted server, service or network by overwhelming the target or its surrounding infrastructure with a flood of internet traffic.

Figure 3:
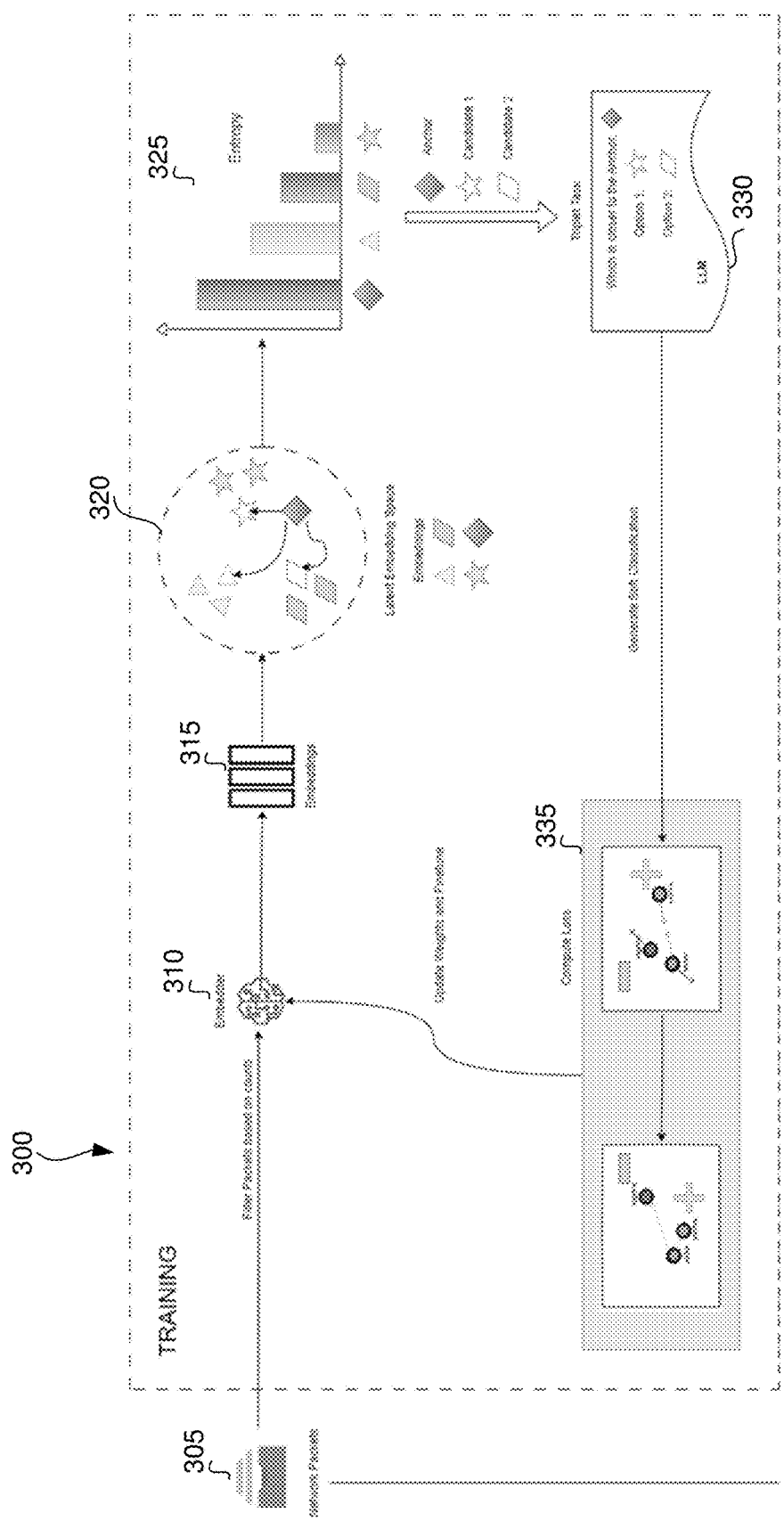
FIG. 3 depicts an example training workflow for training an intelligent malicious packet detection software tool with a large language model to dynamically detect malicious packet(s).

FIG. 3 depicts an example training workflow 300 for training an intelligent malicious packet detection software tool with a large language model to dynamically detect malicious packet(s). With workflow 300, a malicious packet detection software tool can be trained to detect dynamic DDoS attacks by leveraging the use of large language models. The software tool is dynamic and adapts to numerous attack patterns, enhancing cybersecurity for network infrastructure and services. In other implementations, a malicious packet detection software tool can be trained to detect other types of malicious packets, such as packets associated with a virus, malware, spyware, etc.

In workflow 300 of FIG. 3, network packets 305 are received for training workflow 300, and input into an embedder 310. In some embodiments, network packets 305 undergo one or more processing steps before being processed through embedder 310.

Embedder 310 generates embeddings 315 for the input network packets 305. The embeddings 315 are then used by the model to generate clusters for those embeddings at 320. The model further performs an entropy analysis at 325, contrastive learning processing at 330, and computes a loss at 335. The loss is then input into embedder 310 to further refine the generated embeddings during training of the software tool. Each of these steps are discussed in further detail below.

Embeddings

In embodiments of the present disclosure, the intelligent malicious packet detection software tool is based on a transformer neural network architecture. A first step in training a transformer neural network architecture based malicious packet detection software tool is to generate embeddings for input data. In prior systems, features are directly extracted from network packets. However, in implementations of the present disclosure, network packets are parsed through an embedder model (such as embedder 310 of FIG. 3), to generate the embeddings (such as embeddings 315 of FIG. 3). Embeddings 315 are numerical array-like representations of data, which can be visualized on a two-dimensional grid if desired. Embeddings can be clustered (as x and y coordinates) based on previous context and information.

Figure 4:
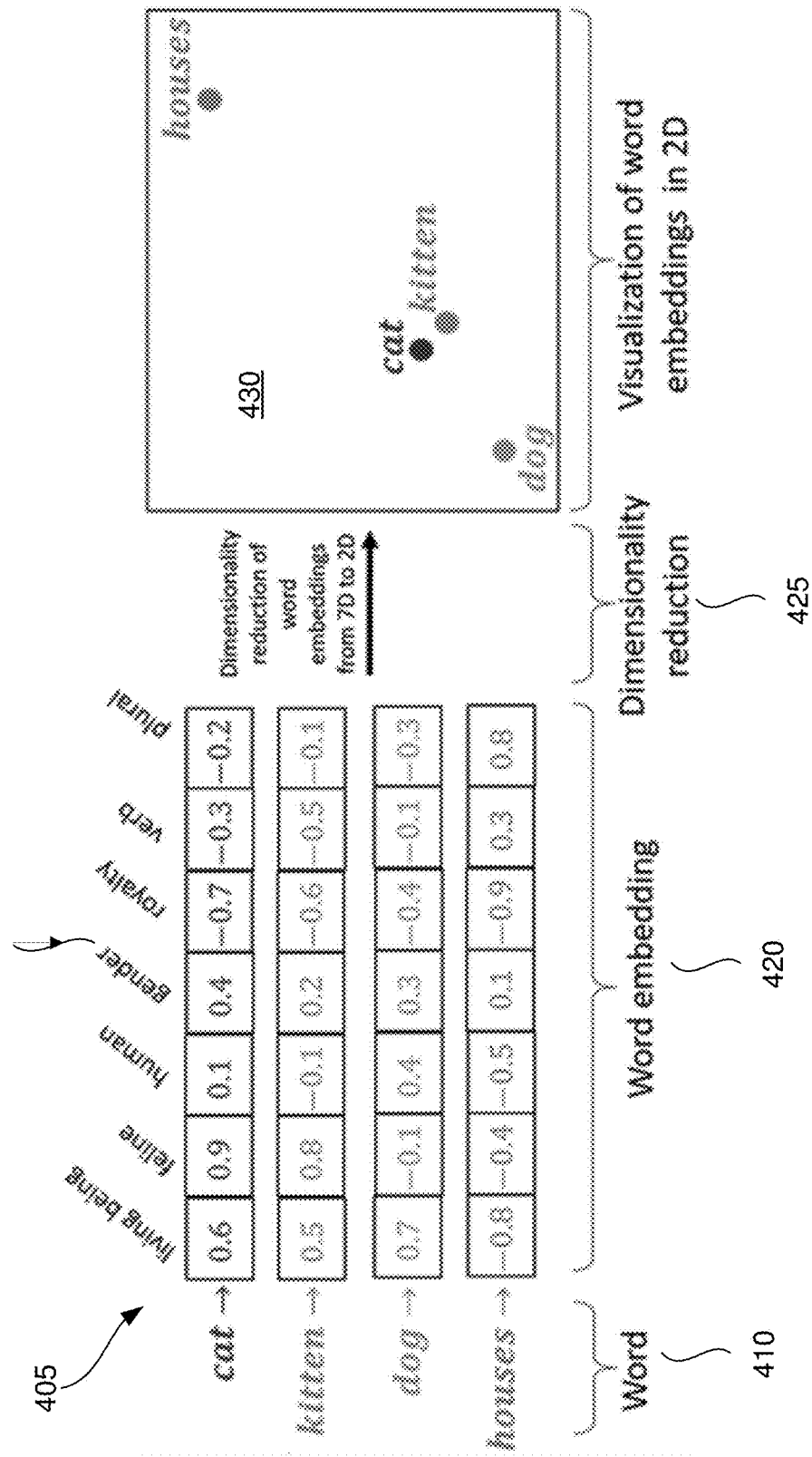
FIG. 4 depicts an exemplary method of generating embeddings, according to prior systems.

FIG. 4 depicts an exemplary method of generating embeddings, according to prior systems. In FIG. 4, a matrix array 405 is generated from input words 410. Word embeddings 420 are generated by an embedder model (such as embedder 310 of FIG. 3) for each of parameters 415, or dimensions. Thus, an embedding (vector array) is generated for each input word, with one embedding value for each parameter 415 of the input word 410. Each box of the array 405 represents a meaningful metric for the machine learning model.

FIG. 4 depicts four exemplary input words, with embeddings generated for each of seven parameters associated with the input words. The embeddings can then undergo dimensionality reduction 425, such that each input word is reduced from seven-dimensions (for seven parameters) to two-dimensions. With two-dimensions, each of the input words can be visualized in two-dimensions on graph 430.

Graph 430 depicts that 'cat' and 'kitten' are located near one another, because the words have a similar contextual meaning. 'Dog' is located a little farther away from the cluster of 'cat' and 'kitten' since it has a different meaning but is also an animal. 'Houses' is located farthest from the other three input words since it is not an animal and thus is less related to the other three input words.

While FIG. 4 depicts one example of embeddings, embodiments of the present disclosure use many more inputs than simply four, and there can be fewer or greater than seven dimensions for each input. However, a similar process to that depicted in exemplary FIG. 4 for generating embeddings is used for the intelligent malicious packet detection software tool. With this embeddings process, input packet data is converted into a numerical representation (such as array 405). These embeddings are subsequently used to teach the intelligent software tool to distinguish between a malicious packet and a non-malicious packet. As discussed herein, a malicious packet is one intended to cause harm to any network infrastructure or service, such as a packet associated with a DDoS attack, virus, malware, etc. A non-malicious packet is one associated with regular network traffic, that is not intended to cause harm to any network infrastructure or service.

Figure 5:
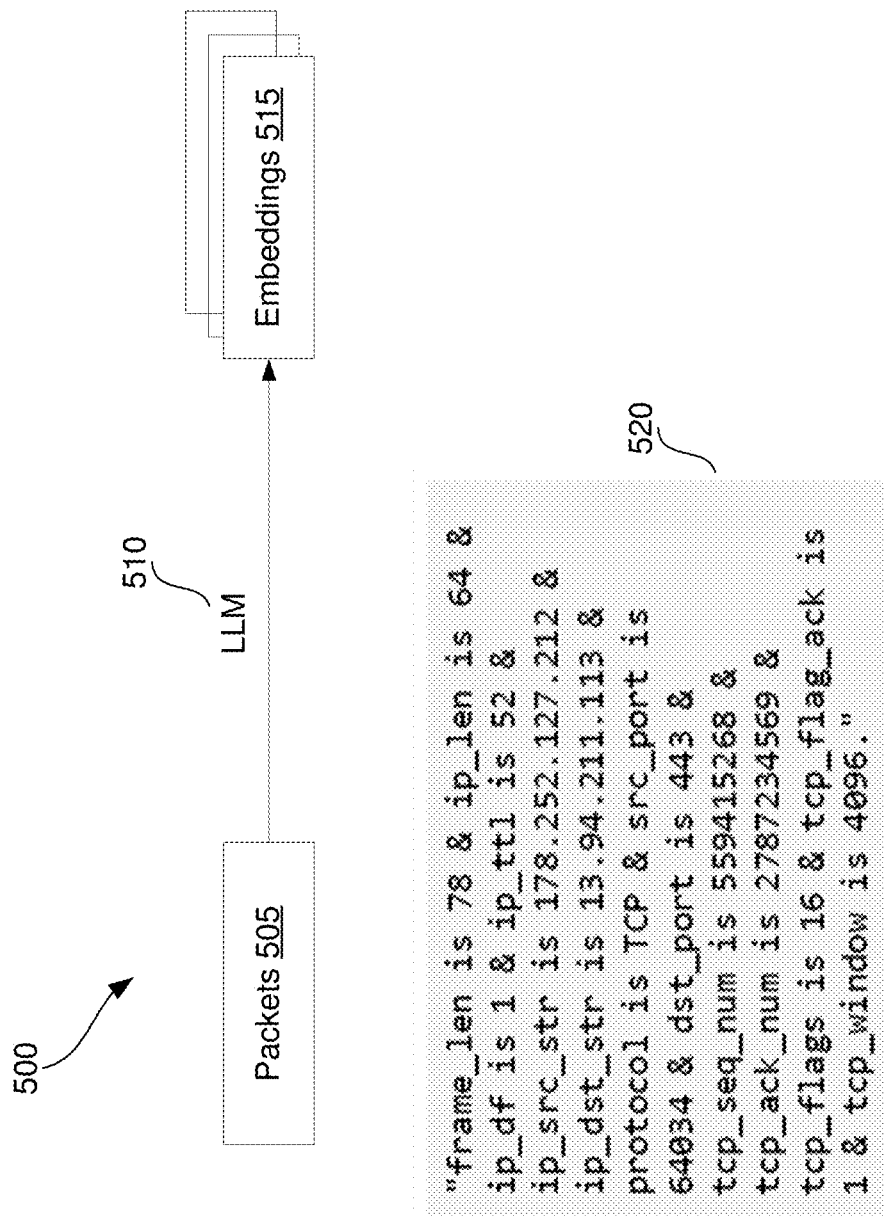
FIG. 5 depicts an example workflow of an embedder model.

FIG. 5 depicts an example workflow 500 of an embedder model (such as embedder 310 of FIG. 3). In the example workflow 500, input packets 505 are input into a large language model 510, to generate embeddings 515. In some embodiments, LLM 510 may utilize a large-scale language model, such as GPT, which has 70B+ parameters. In other implementations, LLM may utilize a smaller model, such as Instructor, which has ~335M parameters.

FIG. 5 further depicts box 520 which has exemplary input data from packets 505 that may be input into LLM 510. Input data from packets 505 may include any one or more of a frame length, IP length, source IP address, destination IP address, protocol (e.g., TCP, UDP, other), source port, destination port, TCP sequence number, TCP ACK number, TCP flags, TCP flag ACK, and TCP window. In various embodiments, other parameters that can be discerned from input packets may also be used in addition to, or instead of, one or more of the above listed parameters.

In some embodiments, any combination of these (or other) parameters are extracted from packets 505, and processed through LLM 510 to generate embeddings 515 in workflow 500. With this, an intelligent malicious packet detection software tool can be trained to detect malicious software based on one or more of these parameters extracted from packets 505.

Fine-Tuning

The intelligent malicious packet detection software tool can further be fine-tuned for specific applications. In one embodiment, the software tool can be fine-tuned specifically for DDoS attack detection.

Figure 6:
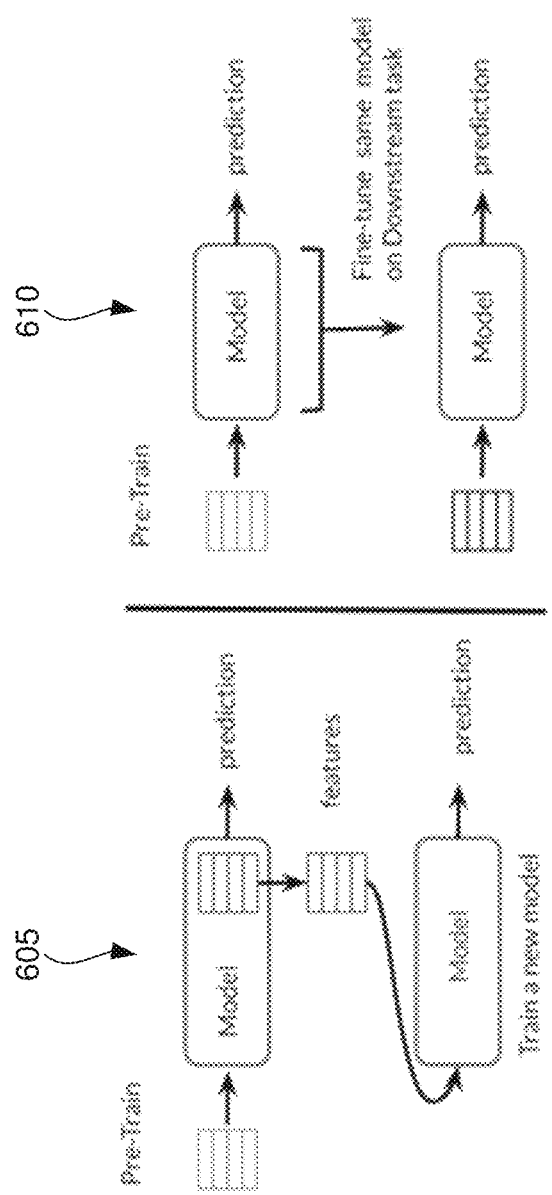
FIG. 6 depicts exemplary workflows for adapting a pretrained machine learning model for a specific application.

FIG. 6 depicts a typical workflow 605 where a pre-trained machine learning model is used to generate a prediction. Features can be extracted from the pre-trained model and further trained on additional training data to generate a new machine learning model trained to generate a particular type of prediction.

However, embodiments of the present disclosure use workflow 610 where a pre-trained machine learning model used to generate a prediction is used. That same model can simply be fine-tuned on a downstream task (such as DDoS attack detection), to generate more accurate predictions specifically for the downstream task. Fine-tuning can thus obviate the need to train a new model.

With fine-tuning workflow 610, a frozen pre-trained model is exposed to novel forms of data, since a model generally cannot perform well on data it has not seen before. This is similar to providing context to a human learning a new subject. Embodiments of the present disclosure use a contrastive learning approach for fine-tuning, which will be discussed in further detail below. Thus, in some embodiments, the embeddings model (such as embedder 310 of FIG. 3) is a pretrained model that is adept at contrastive learning applications. The pretrained model is fed supervised data in the form of positive and negative labels, as discussed further herein.

Clustering and Entropy

After embeddings are generated for input data, a next step is to cluster and sort the data points based on their entropy in the cluster they belong to. In some exemplary cases, clustering is performed on a two-dimensional grid. Some points will have more energy than others, where the energy level represents how unstable they are in the current cluster. Through this clustering step, each data point's position and distance from other clusters is evaluated, for potential reorganization of one or more clusters.

Figure 7:
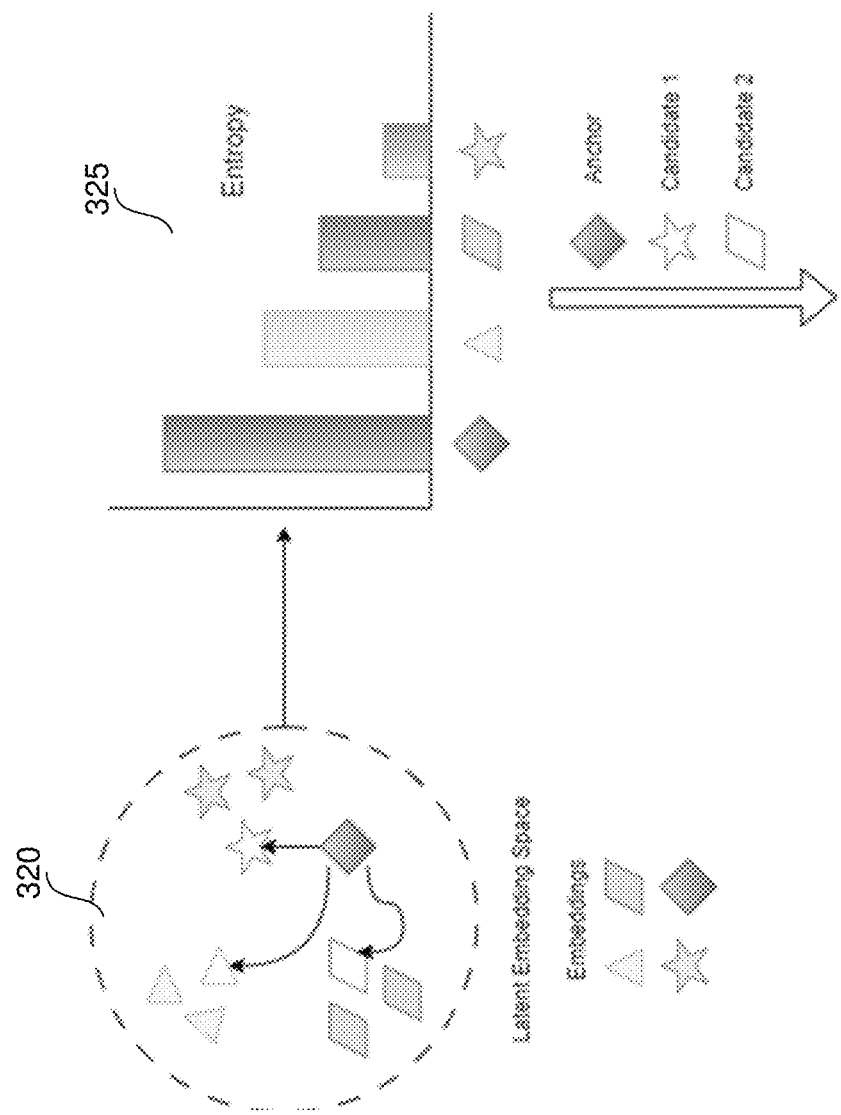
FIG. 7 depicts a simplified view of clustering and entropy analysis steps.

To prepare for fine-tuning of the software tool, an entropy analysis is conducted during the training phase of the intelligent malicious packet detection software tool. FIG. 7 depicts a simplified view of clustering 320 and entropy analysis step 325 from workflow 300 of FIG. 3.

In the entropy analysis, embeddings (such as embeddings 315 of FIG. 3) are grouped into clusters at 320, where each embedding in a cluster is represented by a same shape. That is, in exemplary FIG. 7, embeddings of one cluster are all depicted as triangles, embeddings of another cluster are depicted as stars, embeddings of another cluster are depicted as parallelograms, and embeddings of a fourth cluster are depicted as diamonds. At analysis step 325, the embeddings are sorted in descending order of entropy after clustering. That is, the cluster of embeddings that has the highest entropy (diamond shape) is depicted on the left most side of the bar graph of exemplary FIG. 7. Consequently, the cluster of embeddings that has the lowest entropy (star shape) is depicted on the right most side of the bar graph of exemplary FIG. 7.

A predetermined percentage of highest entropy points are determined to be anchor points for the clustering. In some embodiments, a same percentage of highest entropy points are selected for each trained model. In other embodiments, the percentage of entropy points selected can be dynamically variable based on the input data set, and/or the specific downstream task for which the model is being fine-tuned. In one embodiment, a top 20% of highest entropy points are selected as anchors. In other embodiments, a different percentage (higher or less than 20%) of highest entropy points is selected as anchor points.

For every anchor point, candidate points are selected from a predetermined percentage of nearest clusters. That is, candidate points are points where the embedding may change its designation from one cluster to another, where it has a stronger correlation. In some embodiments, a same percentage of candidate points are selected for each trained model. In other embodiments, the percentage of candidate points selected can be dynamically variable based on the input data set, and/or the specific downstream task for which the model is being fine-tuned. In one embodiment, for every anchor point, candidate points are selected from 2% of the nearest clusters. In other embodiments, a different percentage (higher or less than 2%) of candidate points are selected. Next, candidate pairs are generated by selecting one data point from each candidate cluster.

Fine-Tuning: Contrastive Learning

The model is further fine-tuned using contrastive learning. A prompt is created with a prompt structure of (A, C1, C2)+context task, where A represents an anchor point, C1 represents a first candidate point, and C2 represents a second candidate point. As used herein, this prompt is a query that is fed into a transformer neural network, such as GPT. The neural network is queried as to whether the anchor point is closer to the first candidate point, or closer to the second candidate point. The neural network then produces a soft classification of candidate points. Each candidate point C1 and C2 is labeled as being positive or negative, depending on its proximity to the anchor point.

Figure 8:
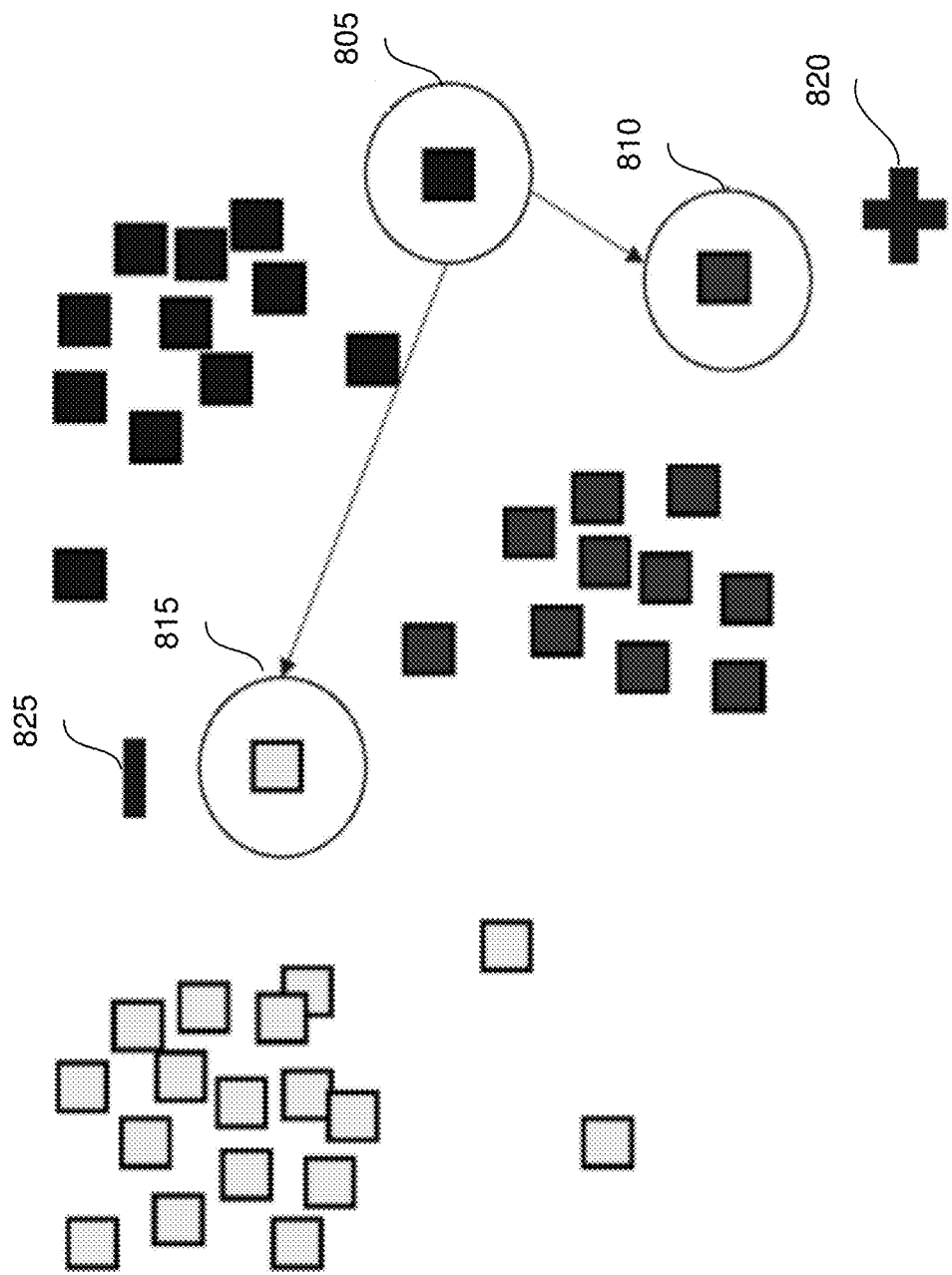
FIG. 8 depicts an exemplary contrastive learning fine-tuning process for an intelligent malicious packet detection software tool.

FIG. 8 depicts an exemplary contrastive learning fine-tuning process for an intelligent malicious packet detection software tool. In the exemplary figure, anchor point 805 is an embedding data point that is determined to be an anchor point, as discussed above. In exemplary FIG. 8, 810 is a first candidate point C1, and 815 is a second candidate point C2.

When a prompt is created with points 805, 810, and 815 and input into an LLM, a soft classification of candidate points is generated. Since a distance between anchor point 805 and candidate point 810 is less than a distance between anchor point 805 and candidate point 815, candidate point 810 is classified as a positive candidate point by the LLM and candidate point 815 is classified as a negative candidate point by the LLM. These are shown in the exemplary figure as positive label 820 for candidate point 810, and negative label 825 for candidate point 815.

For this query, a larger language model (such as GPT) is desirable, since it will have more fine-grained data to distinguish a distance between anchor and candidate points. In contrast, a smaller language model may not have sufficient data to accurately label the candidate points as positive or negative.

Once the candidate points are labeled as being either positive or negative, the neural network is trained to move closer to the positive point and farther from the negative point. This is accomplished by adjusting one or more weights used in the neural network, and serves the purpose of creating more accurate embeddings. If the embedding values are accurate, then the clustering will be accurate. Thus, the neural network is better able to distinguish between malicious (attack) packets and non-malicious (non-attack) packets.

Triplet Loss Formulation

The network can further be trained to update a loss function, such that the anchor and positive candidate point move closer while the negative candidate point moves further away from the anchor point. By teaching the neural network to move closer to the positive point and farther from the negative point (via updating weights of the neural network), more accurate embeddings can be generated by embedder model (such as embedder 310 of FIG. 3).

Figure 9:
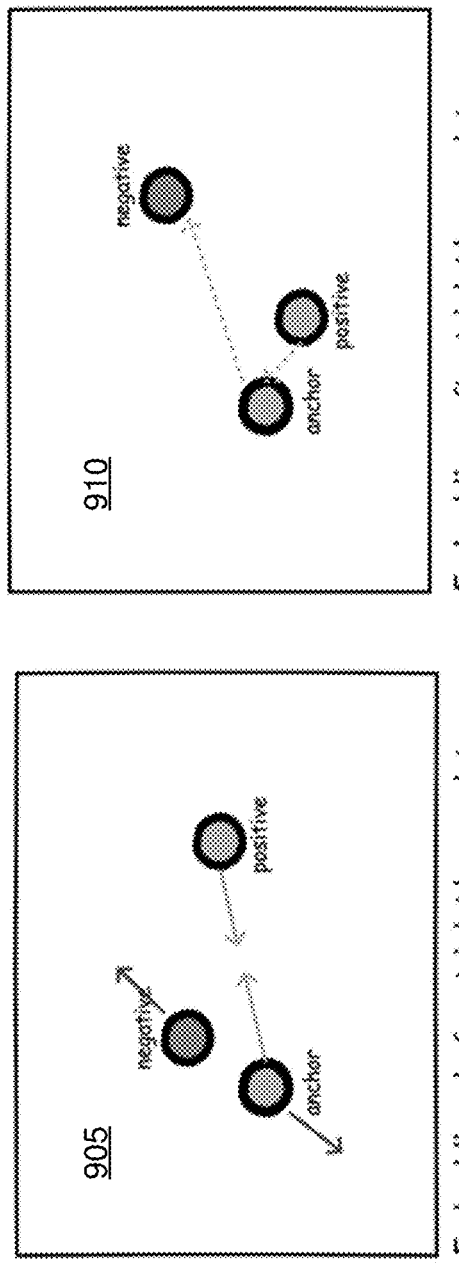
FIG. 9 depicts an exemplary grouping of embeddings before and after a triplet loss update is applied to the intelligent model.

FIG. 9 depicts an exemplary grouping of embeddings before and after a triplet loss update is applied to the intelligent model. Graph 905 depicts an exemplary anchor point, positively labeled candidate point, and negatively labeled candidate point embeddings before a triplet loss update is applied. In graph 905, the anchor point is to move closer to the positively labeled candidate point, and further away from the negatively labeled candidate point.

Graph 910 depicts the same exemplary anchor point, and candidate points after a triplet loss update is applied. As depicted in the figure, the positively labeled candidate point has moved closer to the anchor point, while the negatively labeled candidate point has moved farther away from the anchor point.

In some embodiments, to accomplish the triplet loss formulation, a cosine similarity is first calculated according to the following equation: $s(x, y) = \cos(E_t(I_x \oplus x), E_t(I_y \oplus y))$, where the variable E is used to represent an embedding, the variable I is used to represent a task instruction, and the variables x and y are input texts.

A loss function may be calculated according to the following equation:

$$\mathcal{L} = \frac{e^{s(x, y^+)/\gamma}}{\sum_{y \in \mathcal{B}} e^{s(x, y)/\gamma}},$$

where the variable L' represents a loss value, the variables x and y are input texts, the variable y⁺ is a positive label, and the variable B is the set of positive and negative instances.

In various embodiments, the training methodology described herein can be accomplished in approximately one hour for 1024 queries, where 1 query is comprised of 1 prompt. As discussed herein, a prompt is composed of an anchor point, a first candidate point, a second candidate point, and a context. The training methodology described herein can be accomplished on a GPU, with a configuration of 1-24 GB of cloud GPU from a cloud provider. In some examples, a final training loss for an attack detection software tool is approximately 0.36. With these steps, a finetuned model is ready to generate embeddings for an intelligent malicious packet detection software tool.

The training methodology described herein is for each PCAP file. The process can be repeated for each PCAP file. With every query per PCAP file, model (and hence the ultimate software tool) develops a better understanding of how to distinguish between a malicious and a non-malicious packet.

Inference Workflow

Figure 10:
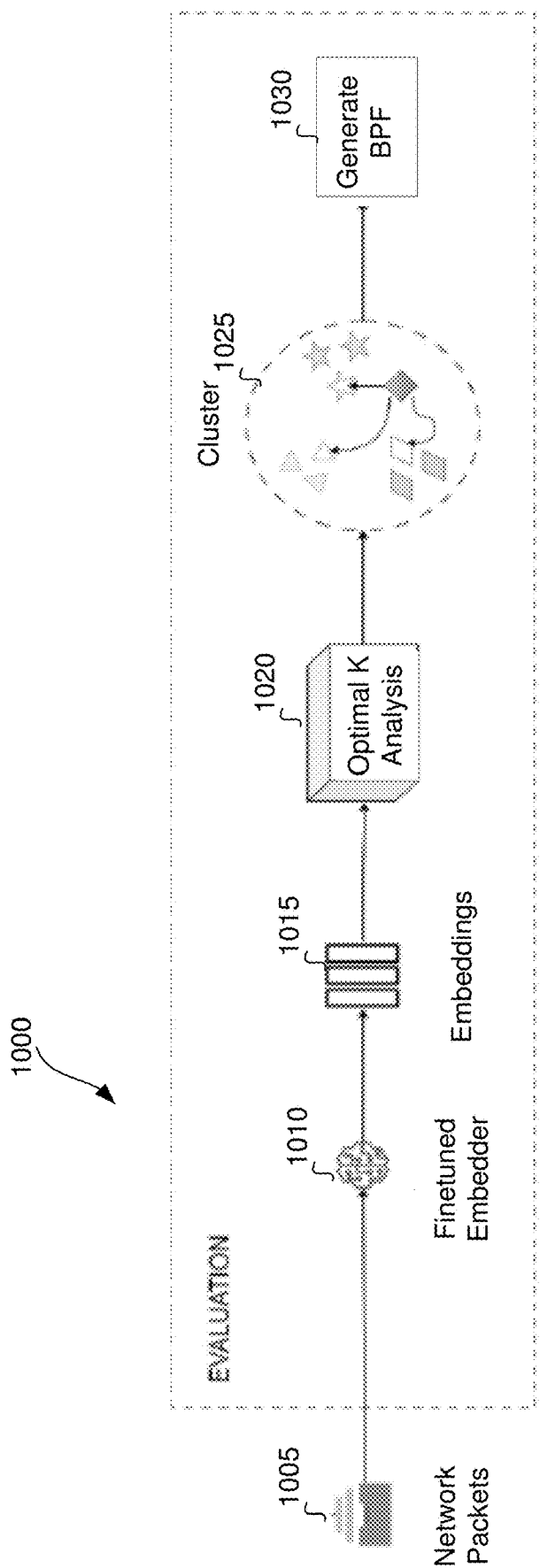
FIG. 10 depicts an exemplary evaluation (inference) workflow for an intelligent malicious packet detection software tool, trained according to the present disclosure.

FIG. 10 depicts an exemplary evaluation (inference) workflow 1000 for an intelligent malicious packet detection software tool, trained according to the present disclosure. While discrete steps are shown in exemplary workflow 1000, there may be fewer or additional steps in other embodiments.

In exemplary workflow 1000, network packets are input into a finetuned embedder moder 1010, which has been trained as discussed herein. The finetuned embedder 1010 then generates embeddings 1015, which undergo an analysis 1020, clustering step 1020, and then a BPF is generated at 1030.

In prior systems, such as that shown in FIG. 2, there was no embedder model. Rather, embeddings were directly generated from extracted features. For example, if a packet IP length is 54, then 54 itself was used as a placeholder value in a numerical representation (embedding), and the clustering was performed based on that value of 54. However, with the present disclosure, the finetuned embedder 1010 can generate a multi-dimensional embedding. In one example, an embedding is a vector of length up to 784. Thus, with more dimensions, the neural network can have a better understanding of the input data, and thus generate more accurate predictions.

Results

FIG. 11 depicts an exemplary table 1100 of results, as to accuracy of prediction of an intelligent malicious packet detection software tool. Column 1105 depicts results from a previous tool set at low sensitivity, column 1110 depicts results from a previous tool set at medium sensitivity, and column 1115 depicts results from a previous tool set at high sensitivity. Column 1120 depicts results from a new software tool that has been trained using the methodology discussed herein.

Table 1100 depicts a percentage of packets filtered on PCAP files. Values greater than 50% are desired, since this threshold indicates larger clusters and better formed clusters are generated by the neural network. As shown in table 1100, columns, 1105, 1110, and 1115 have few data points at the desired threshold of >50%. However, column 1120 for the new tool consistently meets the desired threshold. As such, the presently disclosed intelligent malicious packet detection software tool performs better than even prior systems set at high sensitivity.

Figure 12:
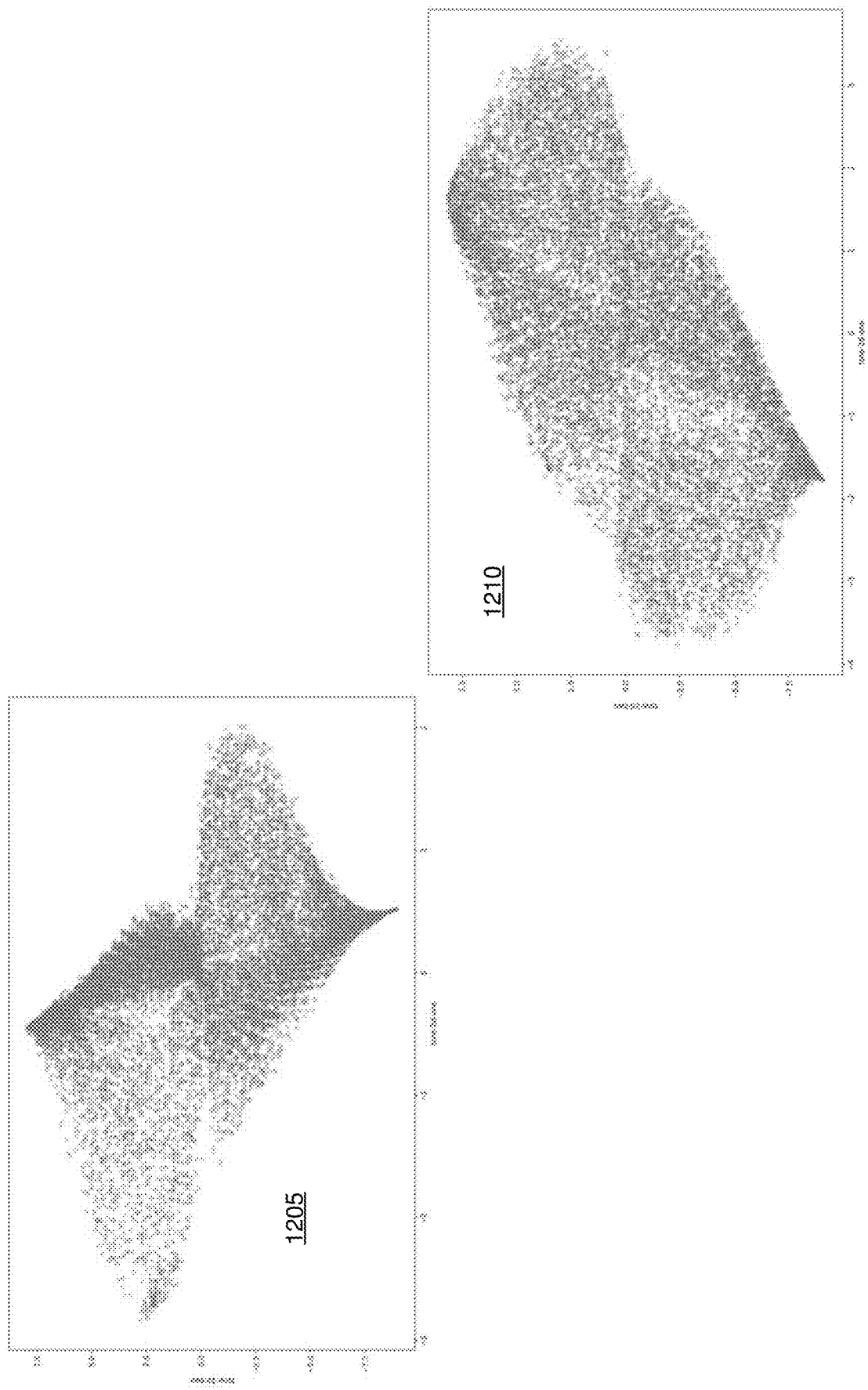
FIG. 12 depicts graphs representing performance of a prior malicious packet detection software tool, and a malicious packet detection software tool of the present disclosure.

FIG. 12 depicts a graph 1205 representing performance of a prior malicious packet detection software tool, and a graph 1210 representing performance of a malicious packet detection software tool of the present disclosure. As seen in the figure, there are fewer high density regions in graph 1210 compared to 1205. Thus, graph 1210 shows that the presently disclosed intelligent malicious packet detection software tool performs better on varied data types, compared to previous systems.

Method for Training the Intelligent Malicious Packet Detection Software Tool

Figure 13:
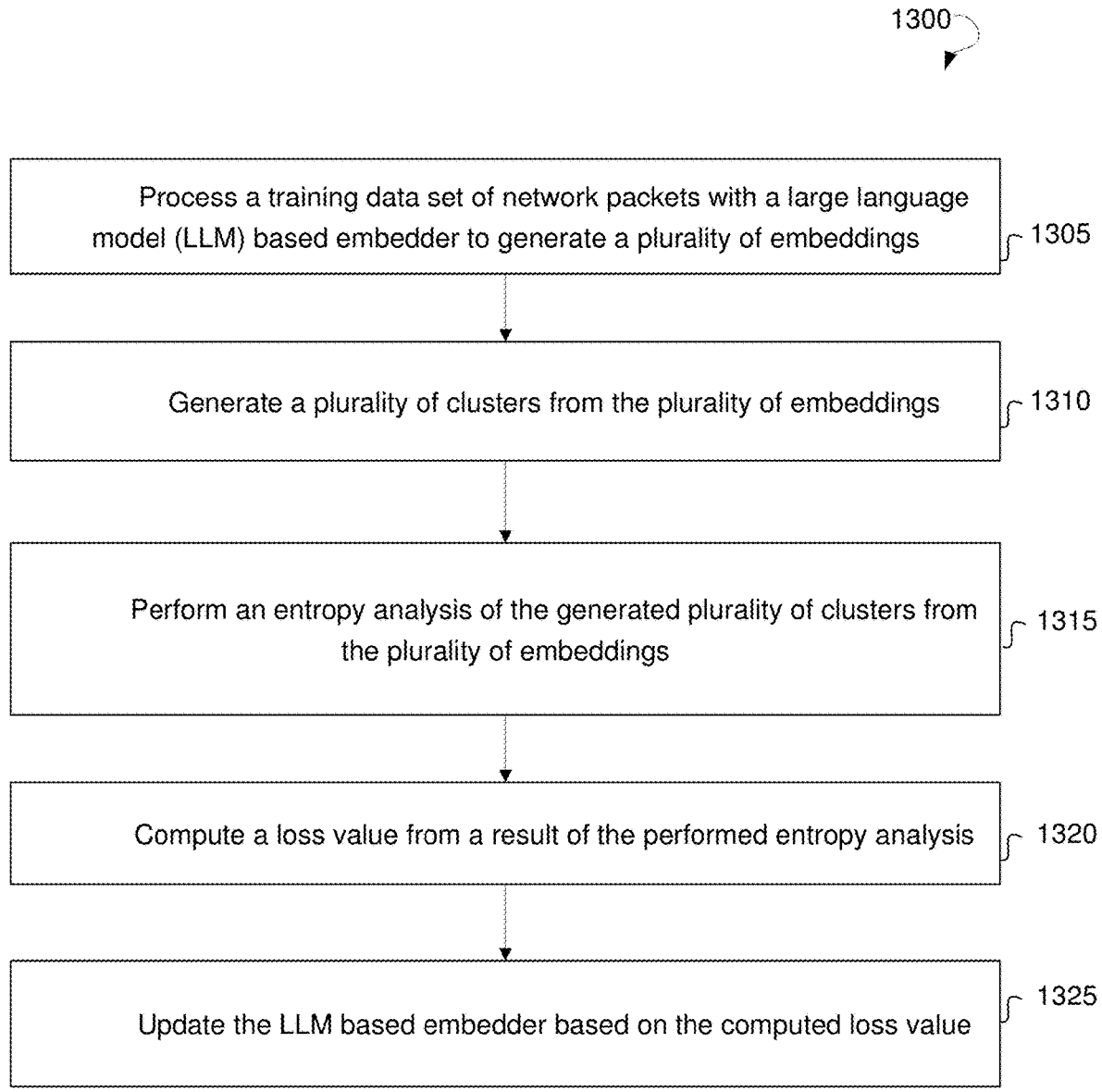
FIG. 13 depicts an exemplary method flow for training an intelligent malicious packet detection software tool.

FIG. 13 depicts an exemplary method flow 1300 for training an intelligent malicious packet detection software tool, according to embodiments of the present disclosure. While discrete steps are depicted in flow 1300, there may be fewer or additional steps in other embodiments. Flow 1300 is complementary to training workflow 300 of FIG. 3.

At 1305 of flow 1300, a hardware computing device (such as that described below) processes a training data set of network packets with a LLM based embedder to generate a plurality of embeddings. In example embodiments, the LLM utilizes a Generative Pre-trained Transformer (GPT) neural network.

The plurality of embeddings are generated to numerically represent the input training data set, as each of the generated plurality of embeddings is a numerical array. As discussed herein, the training data set may be comprised of historical data of previous malicious and non-malicious network traffic. Further, the training data set may comprise at least one of the following parameters for each network packet: destination address, source address, destination port, source port, TCP sequence number, TCP ACK number, packet length, and frame length.

While not expressly depicted in flow 1300, in some embodiments, a dimensionality of at least some of the generated plurality of embeddings is reduced, such that each embedding becomes a two-dimensional coordinate. These two-dimensional coordinates can then be graphically represented.

At 1310 of flow 1300, the computing device generates a plurality of clusters from the generated plurality of embeddings. With the formation of clusters, the embeddings are grouped or classified based on context. At 1315 of flow 1300, the computing device performs an entropy analysis of the generated plurality of clusters. In example embodiments, the entropy analysis may comprise generating a prompt for a query branch of the transformer neural network, where the prompt includes an anchor point, first candidate point, second candidate point, and a context. A contrastive learning process can further be applied to label each of the first candidate point embedding and the second candidate point embedding with one of a positive label and a negative label.

At 1320 of flow 1300, a computing system computes a loss value from a result of the performed entropy analysis. In some embodiments a triplet loss formulation is used for this step. In other embodiments, other types of loss may be calculated in addition to, or instead of, a triplet loss. At 1325 of flow 1300, a computing system updates the LLM based embedder based on the computed loss value. In some embodiments, flow 1300 may operate iteratively until a desired accuracy is reached for a trained intelligent malicious packet detection software tool.

Figure 14:
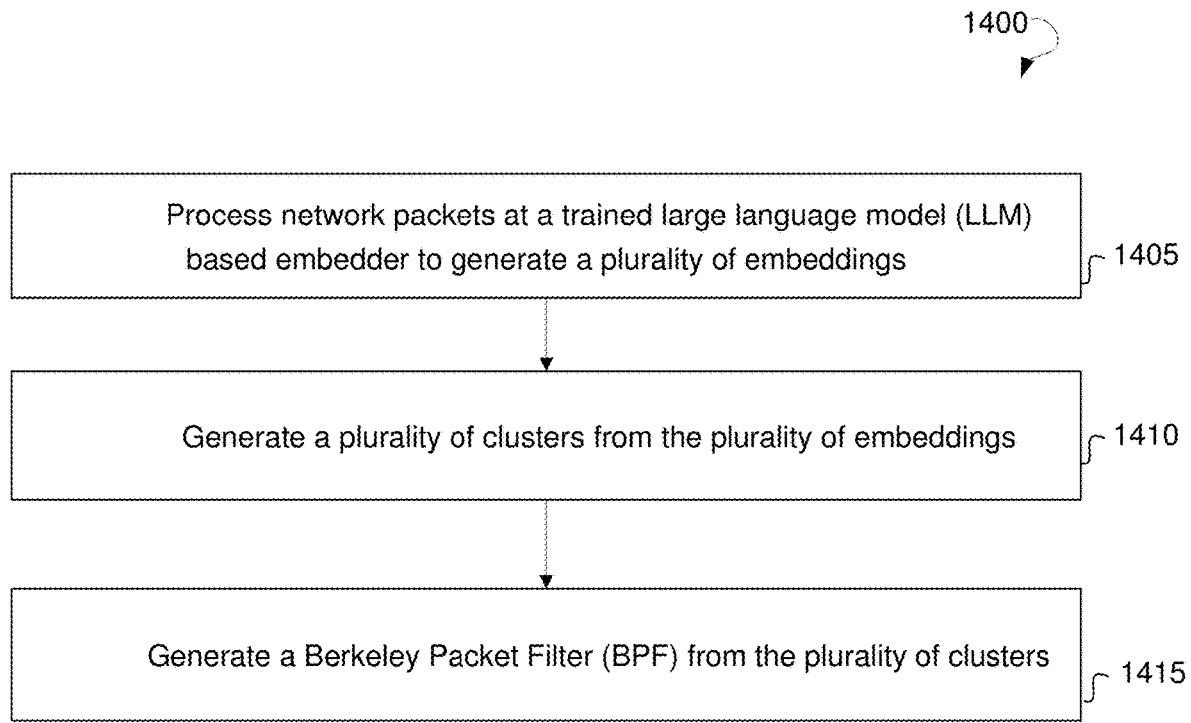
FIG. 14 depicts an exemplary method flow for implementing an intelligent malicious packet detection software tool.

Method for Implementing the Intelligent Malicious Packet Detection Software Tool FIG. 14 depicts an exemplary method flow 1400 for implementing an intelligent malicious packet detection software tool, according to embodiments of the present disclosure. While discrete steps are depicted in flow 1400, there may be fewer or additional steps in other embodiments. Flow 1400 is complementary to workflow 1000 of FIG. 10.

At 1405 of flow 1400, a hardware computing device (such as that described below) processes network packets at a trained large language model (LLM) based embedder to generate a plurality of embeddings. In example embodiments, the LLM utilizes a Generative Pre-trained Transformer (GPT) neural network.

The plurality of embeddings are generated to numerically represent the input network packets, as each of the generated plurality of embeddings is a numerical array. As discussed herein the trained LLM based embedder may use one or more of the following parameters for each network packet: destination address, source address, destination port, source port, TCP sequence number, TCP ACK number, packet length, and frame length.

While not expressly depicted in flow 1400, in some embodiments, a dimensionality of at least some of the generated plurality of embeddings is reduced, such that each embedding becomes a two-dimensional coordinate. These two-dimensional coordinates can then be graphically represented.

At 1410 of flow 1400, the computing device generates a plurality of clusters from the generated plurality of embeddings. With the formation of clusters, the embeddings are grouped or classified based on context.

At 1415 of flow 1400, the computing system generates a Berkeley Packet Filter from the plurality of clusters. While not expressly depicted in flow 1400, computing system may process the data via other means before generating the BPF. In one example embodiment, the computing system determines an optimal K using silhouette analysis. However, other types of analyses may be performed in other embodiments. Further, computing system may use other methods of filtering besides a BPF in various embodiments. Optionally, if network traffic is determined to contain at least one malicious packet from flow 1400, computing system may undertake at least one mitigating action such as dropping the malicious traffic flow, or quarantining the malicious traffic flow, or other actions in response to such malicious traffic.

System for Malicious Packet Detection

Figure 15:
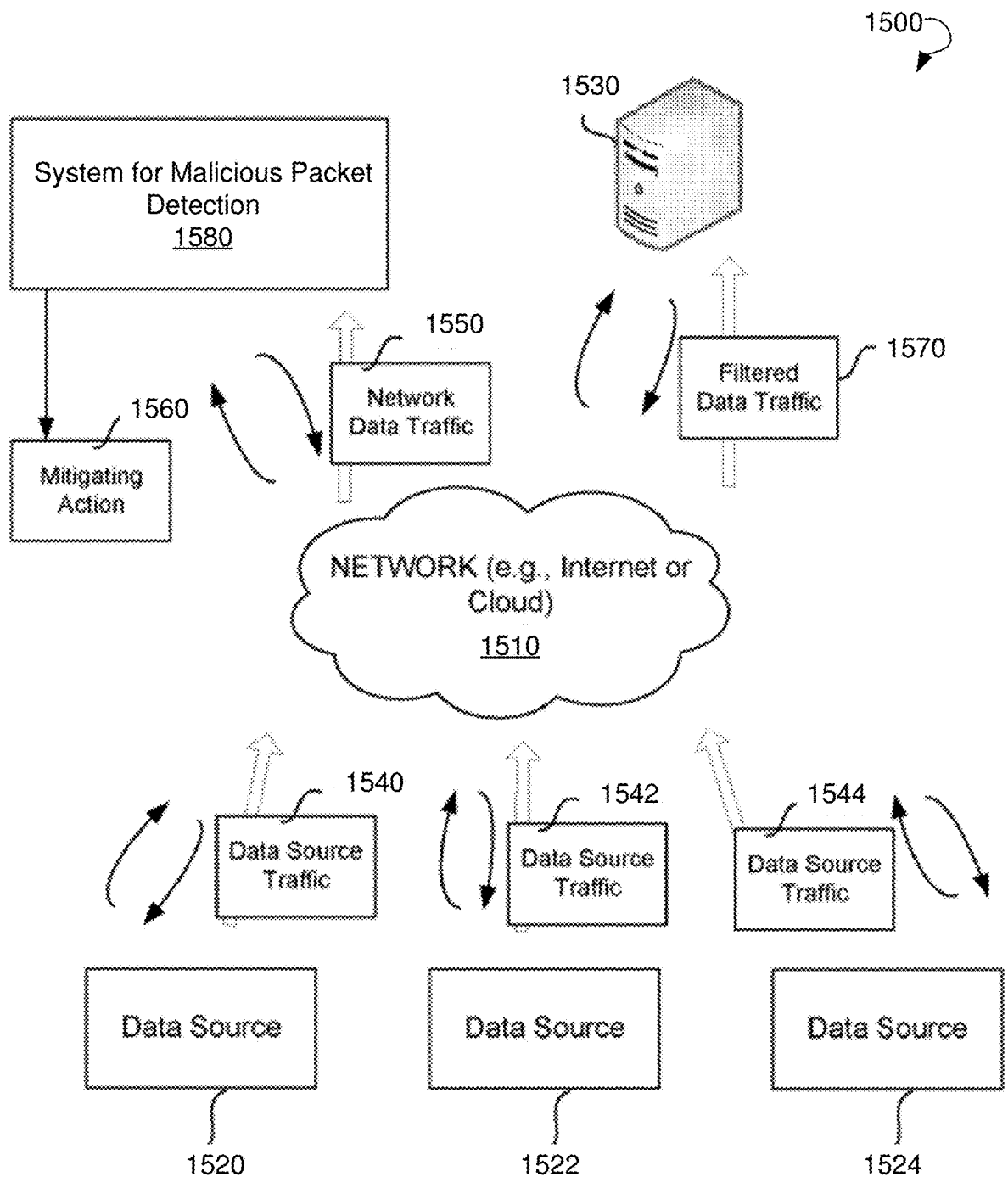
FIG. 15 illustrates an environment within which methods and systems for intelligent malicious packet detection can be implemented.

FIG. 15 illustrates an environment 1500 within which methods and systems for intelligent malicious packet detection can be implemented. The environment 1500 may include a data network shown as a network 1510, such as the Internet or a computing cloud, a plurality of data sources 1520, 1522, and 1524, a server 1530, and a system 1580 for intelligent malicious packet detection. The data sources 1520, 1522, and 1524 may include network machines or network resources. Each of the data sources 1520, 1522, and 1524 may send data traffic shown as data source traffic 1540, 1542, and 1544 to the server 1530. The data sources 1520, 1522, and 1524 and the server 1530 may communicate with each other using the network 1510.

The network 1510 may include the Internet, the cloud, or any other network capable of communicating data between devices. Suitable networks may include or interface with any one or more of, for instance, a local intranet, a Personal Area Network, a Local Area Network, a Wide Area Network, a corporate data network, a data center network, a home data network, a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network 110 can further include or interface with any one or more of an RS-232 serial connection, an IEEE-1394 (FireWire) connection, a Fiber Channel connection, an IrDA (infrared) port, a Small Computer Systems Interface connection, a USB (Universal Serial Bus) connection or other wired or wireless, digital or analog interface or connection, mesh or Digi® networking. The network 1510 may include a network of data processing nodes that are interconnected for the purpose of data communication.

In an example embodiment, the system 1580 may include one or more processors and memory, and be implemented in a form of a security gateway, a network controller, a servicing node, an application delivery controller, or any other network device. In an example embodiment, the system 1580 may be located on a network between a plurality of data sources and a server and may monitor data communications between the data sources and the server.

The system 1580 may intercept data traffic directed to the server 1530. Specifically, the system 1580 may intercept network data traffic 1550 that may include data source traffic 1540, 1542, and 1544 from all data sources 1520, 1522, and 1524. The system 1580 may analyze the network data traffic 1550 and take a mitigating action 1560 with regard to data traffic from data sources classified as undesired (or malicious). Specifically, the system 1580 may filter the network data traffic 150 by blocking the data traffic from undesired data sources and may forward filtered data traffic 1570 to the server 1530.

Example Computing System

Figure 16:
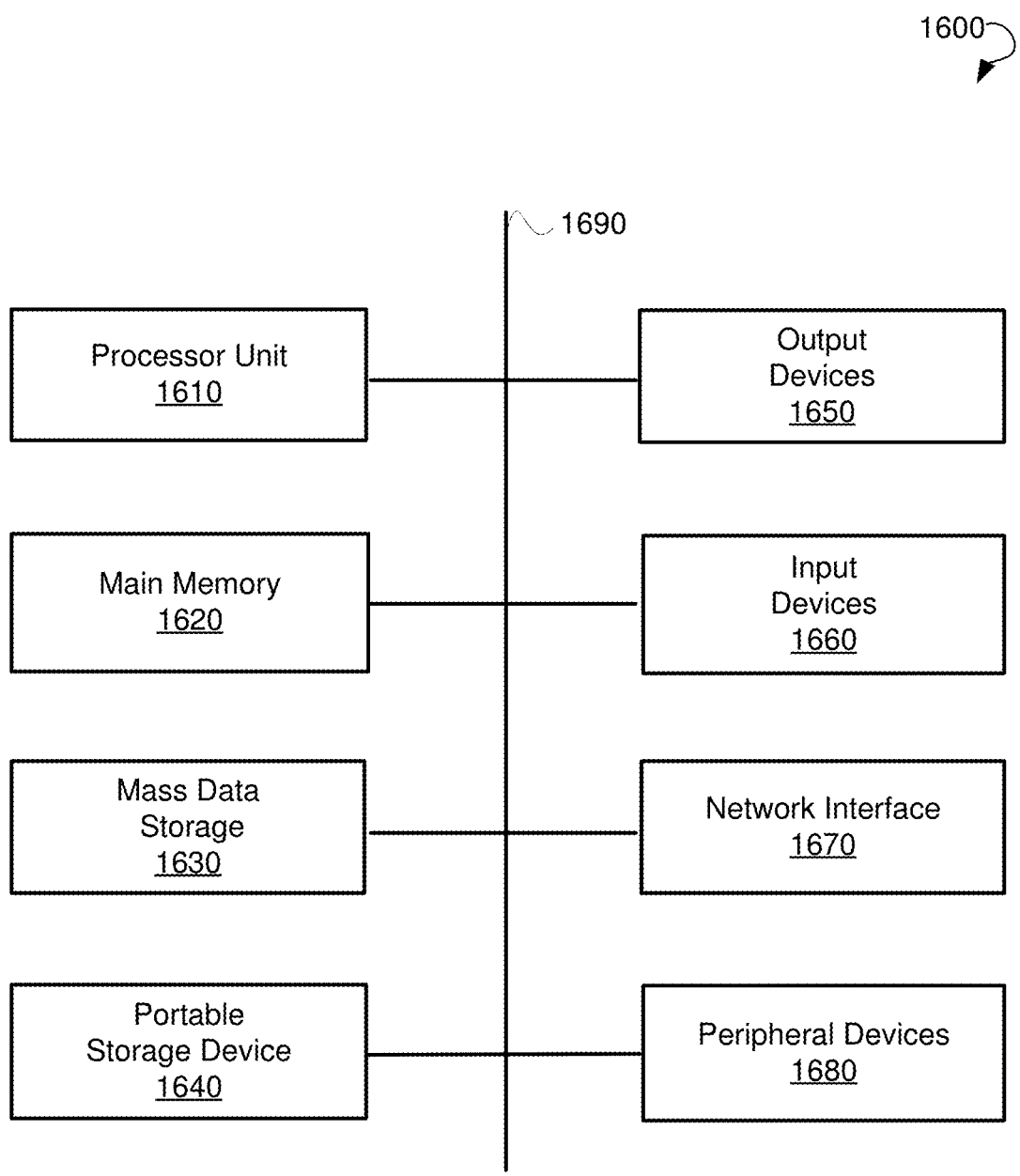
FIG. 16 shows a diagrammatic representation of a computing device for a machine, within which a set of instructions for causing the machine to perform any one or more of the methodologies discussed herein can be executed.

FIG. 16 illustrates an example computing system 1600 that may be used to implement embodiments of the present disclosure (such as system for malicious packet detection 1580 of FIG. 15). The computer system 1600 may serve as a computing device for a machine, within which a set of instructions for causing the machine to perform any one or more of the methodologies discussed herein can be executed. The computer system 1600 can be implemented in the contexts of the likes of computing systems, networks, servers, cloud based systems, or combinations thereof.

The computer system 1600 includes one or more processor units 1610 and main memory 1620. Main memory 1620 stores, in part, instructions and data for execution by processor 1610. Main memory 1620 stores the executable code when in operation. The computer system 1600 further includes a mass data storage 1630, portable storage medium drive(s) 1640, output devices 1650, user input devices 1660, a graphics display system 1670, and peripheral devices 1680. The methods may be implemented in software that is cloud-based.

The components shown in FIG. 16 are depicted as being connected via a single bus 1690. The components may be connected through one or more data transport means. Processor unit 1610 and main memory 1620 are connected via a local microprocessor bus, and mass data storage 1630, peripheral device(s) 1680, portable storage device 1640, and graphics display system 1670 are connected via one or more I/O buses.

Mass data storage 1630, which can be implemented with a magnetic disk drive, solid state drive, or an optical disk drive, is a non-volatile storage device for storing data and instructions for use by processor unit 1610. Mass data storage 1630 stores the system software for implementing embodiments of the present disclosure for purposes of loading that software into main memory 1620.

Portable storage device 1640 operates in conjunction with a portable non-volatile storage medium, such as a floppy disk, Compact Disc, Digital Versatile Disc (DVD), or USB storage device, to input and output data and code to and from the computer system 1600. The system software for implementing embodiments of the present disclosure is stored on such a portable medium and input to the computer system 1600 via the portable storage device 1640.

User input devices 1660 provide a portion of a user interface. User input devices 1660 include one or more microphones, an alphanumeric keypad, such as a keyboard, for inputting alphanumeric and other information, or a pointing device, such as a mouse, a trackball, stylus, or cursor direction keys. User input devices 1660 can also include a touchscreen. Additionally, the computer system 1600 includes output devices 1650. Suitable output devices include speakers, printers, network interfaces, and monitors.

Graphics display system 1670 includes a liquid crystal display or other suitable display device. Graphics display system 1670 receives textual and graphical information and processes the information for output to the display device.

Peripheral devices 1680 may include any type of computer support device to add additional functionality to the computing system.

The components provided in the computing system 1600 of FIG. 16 are those typically found in computing systems that may be suitable for use with embodiments of the present disclosure and are intended to represent a broad category of such computer components that are well known in the art. Thus, the computing system 1600 can be a personal computer, handheld computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory (CD-ROM) disk, DVD, Blu-ray disc, any other optical storage medium, RAM, Programmable Read-Only Memory, Erasable Programmable Read-Only Memory, Electronically Erasable Programmable Read-Only Memory, flash memory, and/or any other memory chip, module, or cartridge.

In some embodiments, the computing system 1600 may be implemented as a cloud-based computing environment, such as a virtual machine operating within a computing cloud. In other embodiments, the computing system 1600 may itself include a cloud-based computing environment, where the functionalities of the computing system 1600 are executed in a distributed fashion. Thus, the computing system 1600, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computing system 1600, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for malicious packet detection via an intelligent large language model have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method of training a large language model based packet detection software tool, the method comprising:
    processing a training data set of network packets with a large language model (LLM) based embedder to generate a plurality of embeddings;
    generating a plurality of clusters from the plurality of embeddings;
    performing an entropy analysis of the generated plurality of clusters from the plurality of embeddings;
    computing a loss value from a result of the performed entropy analysis; and
    updating the LLM based embedder based on the computed loss value, wherein when a malicious packet is detected, an attack detector begins to take actions to mitigate the attack, to launch a counter attack, to publish the identity of the originator of the malicious packet, or to take no action.

2. The method of claim 1, wherein the LLM utilizes a Generative Pre-trained Transformer (GPT) neural network.

3. The method of claim 1, wherein each of the generated plurality of embeddings is a numerical array.

4. The method of claim 3, further comprising reducing at least some of the generated plurality of embeddings to two-dimensional coordinates.

5. The method of claim 4, further comprising generating a two-dimensional graphical representation of the at least some of the generated plurality of embeddings.

6. The method of claim 1, wherein the performing the entropy analysis further comprises determining an anchor point embedding, a first candidate point embedding, and a second candidate point embedding.

7. The method of claim 6, further comprising: using a contrastive learning process to label each of the first candidate point embedding and the second candidate point embedding with one of a positive label and a negative label.

8. The method of claim 1, wherein the training data set of network packets comprises at least one of the following parameters for each network packet: destination address, source address, destination port, source port, TCP sequence number, TCP ACK number, packet length, and frame length.

9. The method of claim 1, wherein the training data set of network packets comprises historical data from past malicious network packets.

10. A method of malicious packet detection via an intelligent large language model, the method comprising:
   processing network packets at a trained large language model (LLM) based embedder to generate a plurality of embeddings;
   generating a plurality of clusters from the plurality of embeddings; and
   generating a Berkeley Packet Filter (BPF) from the plurality of clusters.

11. The method of claim 10, wherein the trained LLM based embedder utilizes a Generative Pre-trained Transformer (GPT) neural network.

12. The method of claim 10, wherein the trained LLM based embedder is trained with a contrastive learning process.

13. The method of claim 10, wherein the processing the network packets comprises processing at least one of the following parameters for each network packet: destination address, source address, destination port, source port, TCP sequence number, TCP ACK number, packet length, and frame length.

14. The method of claim 10, wherein the trained LLM based embedder is trained with historical data from past malicious network packets.

15. A system for malicious packet detection via a large language model, the system comprising:
   at least one processor configured to:
      process network packets at a trained large language model (LLM) based embedder to generate a plurality of embeddings;
      generate a plurality of clusters from the plurality of embeddings; and
      generate a Berkeley Packet Filter (BPF) from the plurality of clusters.

16. The system of claim 15, wherein the trained LLM based embedder utilizes a Generative Pre-trained Transformer (GPT) neural network.

17. The system of claim 15, wherein the trained LLM based embedder is trained with a contrastive learning process.

18. The system of claim 15, wherein the wherein the processing the network packets comprises processing at least one of the following parameters for each network packet: destination address, source address, destination port, source port, TCP sequence number, TCP ACK number, packet length, and frame length.

19. The system of claim 15, wherein the trained LLM based embedder is trained with historical data from past malicious network packets.

* * * * *